Nov. 5, 1957   J. F. ALCOCK   2,811,826
POWER UNITS INCLUDING AN INTERNAL COMBUSTION ENGINE
AND AN EXHAUST-DRIVEN TURBO SUPERCHARGER
Filed Jan. 6, 1953
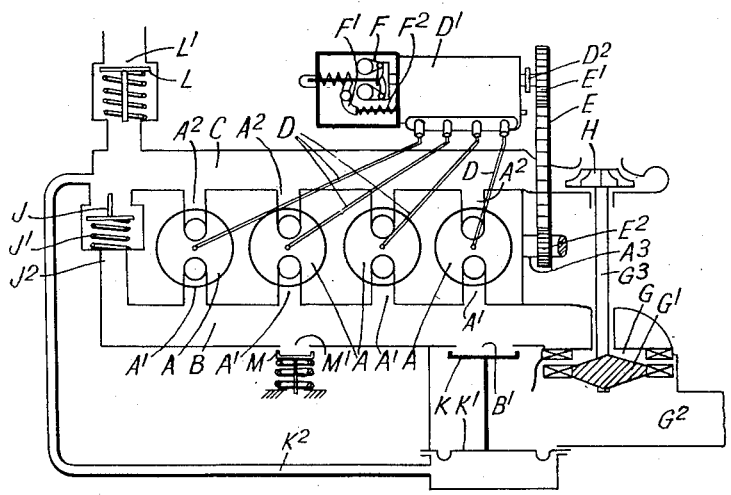
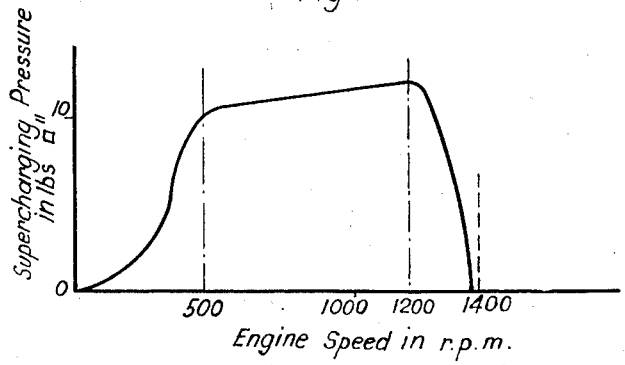
Inventor
JOHN F. ALCOCK
By Watson, Cole, Grindle
& Watson
Attorneys

United States Patent Office 2,811,826
Patented Nov. 5, 1957

2,811,826

POWER UNITS INCLUDING AN INTERNAL COMBUSTION ENGINE AND AN EXHAUST-DRIVEN TURBO SUPERCHARGER

John Forster Alcock, North Lancing, England, assignor to Ricardo & Co., Engineers (1927) Limited, London, England, a company of Great Britain Application January 6, 1953, Serial No. 329,825

Claims priority, application Great Britain January 11, 1952

2 Claims. (Cl. 60—13)

This invention relates to power units of the kind including an internal combustion engine of the liquid fuel injection compression ignition type operating on the four-stroke cycle and an exhaust-driven turbo-supercharger, that is to say an assembly comprising a turbine arranged to be driven by exhaust gases from the internal combustion engine and to drive a compressor arranged to supply air under pressure to the inlet passage or passages of the internal combustion engine.

An object of the invention is to provide a power unit of the above kind which will meet to a satisfactory degree and in a simple and effective manner the operational requirements of traction locomotives and other apparatus in which the internal combustion engine is required to operate over a wide range of speeds and relatively high torque is required at low speeds with a reduction in torque when operating over the upper part of the speed range.

A power unit according to the present invention includes an internal combustion engine of the liquid fuel injection compression ignition type operating on the four stroke cycle and designed to operate over a wide range of speeds, means operable over at least the upper half of the speed range for automatically reducing the quantity of fuel delivered to the engine per cycle with increases in speed, a turbine arranged to be driven by exhaust gases from the internal combustion engine and to drive a compressor supplying supercharging air to the inlet passage or passages of the engine, at least one by-pass passage by which a proportion of the air delivered by the compressor can by-pass the internal combustion engine, and be delivered with the exhaust gases to the turbine, and non-return valve apparatus in the by-pass passage or passages arranged to prevent flow of gas from the exhaust passage or passages of the engine into the air inlet passage or passages thereof.

Preferably a relief valve is also provided for permitting escape of gas from the exhaust passage or passages of the engine and arranged to be operated by a device sensitive to the difference in the pressures respectively in the inlet and exhaust passages so as to be opened when the pressure in the exhaust passage or passages exceeds that in the inlet passage or passages and thus permit escape of exhaust gases to the atmosphere under these conditions.

Moreover the power unit preferably includes automatic air inlet valve apparatus arranged to admit air direct from the atmosphere to the inlet passage or passages of the engine when the pressure in such passage or passages falls below atmospheric pressure.

Thus with a power unit according to the invention it will be seen that in the simplest case where there is no relief valve and no automatic air inlet valve, the supercharging pressure will be approximately equal to or below the exhaust pressure under all working conditions, and any surplus air available under certain working conditions will be delivered through the by-pass passage direct to the turbine with the exhaust gases. When a relief valve is provided as above described, this valve will, moreover, open automatically to permit escape of exhaust gases direct to the atmosphere if and when the exhaust gas pressure exceeds the inlet pressure while, when in addition an automatic air inlet valve is provided as above described, this will open to permit air to be drawn into the air inlet passage or passages direct from the atmosphere under conditions in which the turbo-supercharger cannot maintain a supercharging pressure.

One form of power unit according to the invention is illustrated diagrammatically by way of example in Figure 1 of the accompanying drawings while Figure 2 shows a typical boost pressure-speed curve for such an engine.

In the form of power unit shown in Figure 1 the power unit comprises an internal combustion engine of the liquid fuel injection compression ignition type having four cylinders indicated at A, the exhaust ports $A^1$ of which are connected to an exhaust passage or manifold B while the inlet ports $A^2$ are connected to an inlet passage or manifold C. Fuel is delivered in normal manner to the cylinders A through injection devices supplied with fuel through fuel delivery passages D from a fuel injection pump $D^1$ of usual type. The shaft $D^2$ of the fuel injection pump $D^1$ is driven at half engine speed through a chain E connecting a sprocket wheel $E^1$ on the shaft $D^2$ to a sprocket wheel $E^2$ on the crank shaft $A^3$ of the engine. Driven from the shaft $D^2$ of the fuel pump is a centrifugal governor F which acts through mechanism indicated at $F^1$ on the usual control rack $F^2$ or similar control device of the fuel pump $D^1$, which determines the quantity of fuel delivered by the pump during each cycle of operation.

The governor F is so constructed and set that it progressively reduces the quantity of fuel supplied by the fuel pump $D^1$ per cycle to the engine with increases of engine speed above say one quarter maximum speed, that is to say, in a typical example from a speed of say approximately 500 R. P. M. upwards. The exhaust passage B is arranged to deliver the exhaust gases from the cylinders A to a turbine G the rotor $G^1$ of which is connected through a shaft $G^3$ to a centrifugal super-charging blower H arranged to draw air from the atmosphere and deliver it to the inlet passage C.

Arranged between the inlet passage C and the exhaust passage B is by-pass passage $J^2$ controlled by a non-return valve J having a light spring $J^1$ tending to maintain it closed, this non-return valve J being formed and arranged so that it prevents the flow of exhaust gas from the exhaust passage B to the inlet passage C but permits flow of air from the inlet passage C to the exhaust passage B if and when the pressure in the inlet passage C exceeds by a small degree the pressure in the exhaust passage B.

The valve J thus constitutes a by-pass valve permitting air from the inlet passage C to by-pass the engine A and enter the exhaust passage B when pressure in the inlet passage C exceeds by any substantial degree the pressure in the exhaust passage B.

Also formed in the exhaust passage B is a relief port $B^1$ controlled by a relief valve K the opening of which is controlled by a diaphragm $K^1$ one face of which is subject to the pressure in an outflow passage $G^2$ into which the exhaust from the turbine G flows (i. e., approximately atmospheric pressure), while its other face is subject, through a passage $K^2$, to the pressure in the inlet passage C.

The valve K is itself subject to the pressure in the exhaust passage B on one face and to the pressure in the exhaust passage $G^2$ on its other face and the arrangement is such that the valve K will open whenever the pressure in the exhaust passage B appreciably exceeds that in the inlet passage C so as then to permit escape of exhaust gas from the exhaust passage B direct to the outflow passage $G^2$.

In addition, a simple non-return air inlet valve L controls an atmospheric air inlet port $L^1$ leading to the inlet passage C so as to permit atmospheric air to be drawn into this passage if the pressure therein falls appreciably below atmospheric pressure, while a safety valve M controls an escape port M¹ in the exhaust passage B so as to permit escape of exhaust gas therefrom if the pressure in the exhaust passage exceeds some pre-determined pressure in excess of the maximum which it is desired should be maintained in the inlet and exhaust passages C and B, say the pressure of 13 lbs. per square inch where the normal maximum working pressure in the inlet and exhaust passages is 10 lbs. per square inch.

In a preferred case, the turbo supercharger H, would be designed to pass the maximum possible amount of air consistent with maintaining the pressure in the inlet passage C equal to that in the exhaust passage B and at the required maximum figure, say, as in the example shown in Figure 2, approximately 10 lbs. per square inch and with considerable surplus air available when the engine is operating with maximum fuel injection, that is to say, at the selected maximum speed above which the governor F comes into effect to reduce the quantity of fuel delivered per cycle, say a speed of 500 R. P. M. as indicated in Figure 2. Under these conditions the engine will consume the proportion of the total air available from the supercharger H which it requires to maintain such operation, say about 45% of the total air available, surplus air passing through the by-pass valve J and passage J² into the exhaust passage B and then, with the exhaust gases, through the turbine G. As the engine speed increases from the selected speed of say 500 R. P. M. the proportion of the total air available which the engine consumes will increase until at a certain higher speed, say 1,200 R. P. M. it consumes all the air available at the selected pressure of approximately 10 lbs. per square inch, and no air is therefore passed through the by-pass valve J and passage J².

Above this speed range the exhaust gases from the engine will tend to exceed what the turbine G can pass with the compressor H maintaining a 10 lbs. per square inch supercharging pressure with the result that the pressure in the exhaust passage B tends to rise relatively to the supercharging pressure in the inlet passage C and the relief valve K is thus opened to the extent necessary to prevent this rise. As the engine speed increases still further therefore the supercharging pressure in the inlet passage C drops as indicated in Figure 2, until, at a speed of say between 1,300 and 1,400 R. P. M. in the example under consideration it reaches zero. For still further rises in engine speed, if the automatic inlet valve L were not provided the pressure in the inlet passage C would be appreciably further reduced due to the engine trying to draw in more air through the compressor H than this compressor can pass, but if the automatic inlet valve L is provided, this valve will open under these conditions to permit air to be drawn therethrough direct from the atmosphere to supplement the supply from the compressor H and thus enable the pressure in the inlet passage C to remain in the neighbourhood of atmospheric pressure.

It will be appreciated that the valves J, K, L and M associated with the inlet and exhaust manifolds of the power unit are preferably provided in known manner with dashpots or other damping means to check "flutter" due to pulsations in these passages.

What I claim as my invention and desire to secure by Letters Patent is:

1. A power unit including an internal combustion engine of the liquid fuel injection compression ignition type, operating on the 4-stroke cycle and designed to operate over a wide range of speeds, means operable over at least the upper half of the engine speed range for automatically reducing the quantity of fuel delivered to the engine per cycle with increases in speed, a turbine arranged to be driven by exhaust gases from the internal combustion engine and to drive a compressor supplying super-charging air to the inlet passage or passages of the engine, at least one by-pass passage by which a proportion of the air delivered by the compressor can by-pass the internal combustion engine and be delivered with the exhaust gases to the turbine, and non-return valve apparatus in the by-pass passage arranged to prevent the flow of gas from the exhaust passage or passages of the engine into the air inlet passage or passages, a relief port leading from the exhaust passage or passages of the engine to the atmosphere and pressure-responsive means responsive to the difference in the pressures respectively in the inlet and exhaust passages, and a relief valve operated by said pressure-responsive means to open automatically when the pressure in the exhaust passage or passages exceeds that in the inlet passage or passages to any substantial degree and thereby permit escape of exhaust gases to the atmosphere under these conditions.

2. A power unit as claimed in claim 1 including air inlet valve apparatus arranged to admit air automatically direct from the atmosphere to the inlet passage or passages of the engine when the pressure in such inlet passage or passages falls to any substantial degree below atmospheric pressure.

References Cited in the file of this patent

UNITED STATES PATENTS

| | | |
|---|---|---|
| 2,373,139 | Morris | Apr. 10, 1945 |
| 2,385,366 | Lysholm | Sept. 25, 1945 |
| 2,465,784 | Berlyn et al. | Mar. 29, 1949 |
| 2,559,623 | Holmes | July 10, 1951 |
| 2,567,486 | Johansson | Sept. 11, 1951 |
| 2,585,968 | Schneider | Feb. 19, 1952 |
| 2,608,051 | Nettel | Aug. 26, 1952 |
| 2,633,698 | Nettel | Apr. 7, 1953 |

FOREIGN PATENTS

| | | |
|---|---|---|
| 421,110 | Great Britain | Dec. 17, 1934 |